US012531080B2

(12) United States Patent
Xu et al.

(10) Patent No.: US 12,531,080 B2
(45) Date of Patent: Jan. 20, 2026

(54) SYSTEMS AND METHODS FOR ENHANCING SPEECH AUDIO SIGNALS

(71) Applicant: Adeia Guides Inc., San Jose, CA (US)

(72) Inventors: Ning Xu, Irvine, CA (US); Zhiyun Li, Kenmore, WA (US)

(73) Assignee: Adeia Guides Inc., San Jose, CA (US)

( * ) Notice: Subject to any disclaimer, the term of this patent is extended or adjusted under 35 U.S.C. 154(b) by 231 days.

(21) Appl. No.: 18/228,466

(22) Filed: Jul. 31, 2023

(65) Prior Publication Data

US 2025/0046329 A1 Feb. 6, 2025

(51) Int. Cl.
| | |
|---|---|
| *G10L 21/034* | (2013.01) |
| *G06F 3/01* | (2006.01) |
| *G06V 40/16* | (2022.01) |
| *G10L 15/26* | (2006.01) |
| *G10L 21/0208* | (2013.01) |
| *G10L 25/84* | (2013.01) |
| *H04R 3/00* | (2006.01) |
| *G10L 21/0216* | (2013.01) |

(52) U.S. Cl.
CPC ............ *G10L 21/034* (2013.01); *G06F 3/013* (2013.01); *G06V 40/171* (2022.01); *G10L 15/26* (2013.01); *G10L 21/0208* (2013.01); *G10L 25/84* (2013.01); *H04R 3/005* (2013.01); *G10L 2021/02166* (2013.01)

(58) Field of Classification Search
CPC ... G10L 21/034; G10L 15/26; G10L 21/0208; G10L 25/84; G10L 2021/02166; H04R 3/005; G06V 40/171; G06F 3/013
USPC ................ 381/56, 58, 92, 107, 365
See application file for complete search history.

(56) References Cited

U.S. PATENT DOCUMENTS

| | | | |
|---|---|---|---|
| 2002/0161582 A1* | 10/2002 | Basson | G10L 21/06 704/E21.02 |
| 2016/0080874 A1* | 3/2016 | Fullam | G06F 3/013 381/313 |
| 2018/0174586 A1* | 6/2018 | Zamora Esquivel | G06V 10/764 |
| 2022/0116705 A1* | 4/2022 | Brimijoin, II | H04R 3/005 |
| 2023/0071778 A1* | 3/2023 | Du | G10L 21/18 |

OTHER PUBLICATIONS

Beamforming—The Wayback Machine, Jun. 24, 2023 https://web.archive.org/web/20230624124521/https://en.wikipedia.org/wiki/Beamforming.

K.M. Houston, "A fast beamforming algorithm," (Abstract only) Proceeding of Oceans'94, Date of Conference Sep. 13-16, 1994. https://web.archive.org/web/20180613171144/https://ieeexplore.ieee.org/document/363872/.

Mohamed Hamdy, Beamformers Explained, Commscope (2020) The Wayback Machine https://web.archive.org/web/20230601190624/http://www.commscope.com/globalassets/digizuite/542044-beamformer-explained-wp-114491-en.pdf.

(Continued)

*Primary Examiner* — William A Jerez Lora
(74) *Attorney, Agent, or Firm* — HALEY GUILIANO LLP

(57) ABSTRACT

A method and device for enhancing speech audio signals of an individual in a noisy environment based on a user's gaze and a captured image of the user's environment. A direction of a user's gaze is determined using image sensors configured to capture an orientation of a user's eyes and an image of the user environment is captures. Spatial audio is captured and analyzed along with the direction of gaze and image of the user environment to enhance audio of an active speaker.

20 Claims, 11 Drawing Sheets

(56) References Cited

OTHER PUBLICATIONS

Nischay Khanna, What is Beamforming? How Does It Make Your Wi-Fi Faster?, published Nov. 12, 2022 The Wayback Machine https://web.archive.org/web/20230619203729/https://www.makeuseof.com/what-is-beamforming-how-does-it-make-wifi-faster/.

"Keith Shaw, "Beamforming uses the science of electromagnetic interference to make Wi-Fi and 5G connections more precise."", Aug. 2, 2023, The Wayback Machine https://web.archive.org/web/20230802174356/https://www.networkworld.com/article/3445039/beamforming-explained-how-it-makes-wireless-communication-faster.html.

Mahsa S. Ziksari et al. "Fast Beamforming Method for Plane Wave Compounding Based on Beamspace Adaptive Beamformer and Delay-Multiply-and-Sum," Ultrasound in Medicine & Biology, vol. 59(5), pp. 1164-1172 (2023) https://www.sciencedirect.com/science/article/abs/pii/S0301562923000017.

\* cited by examiner

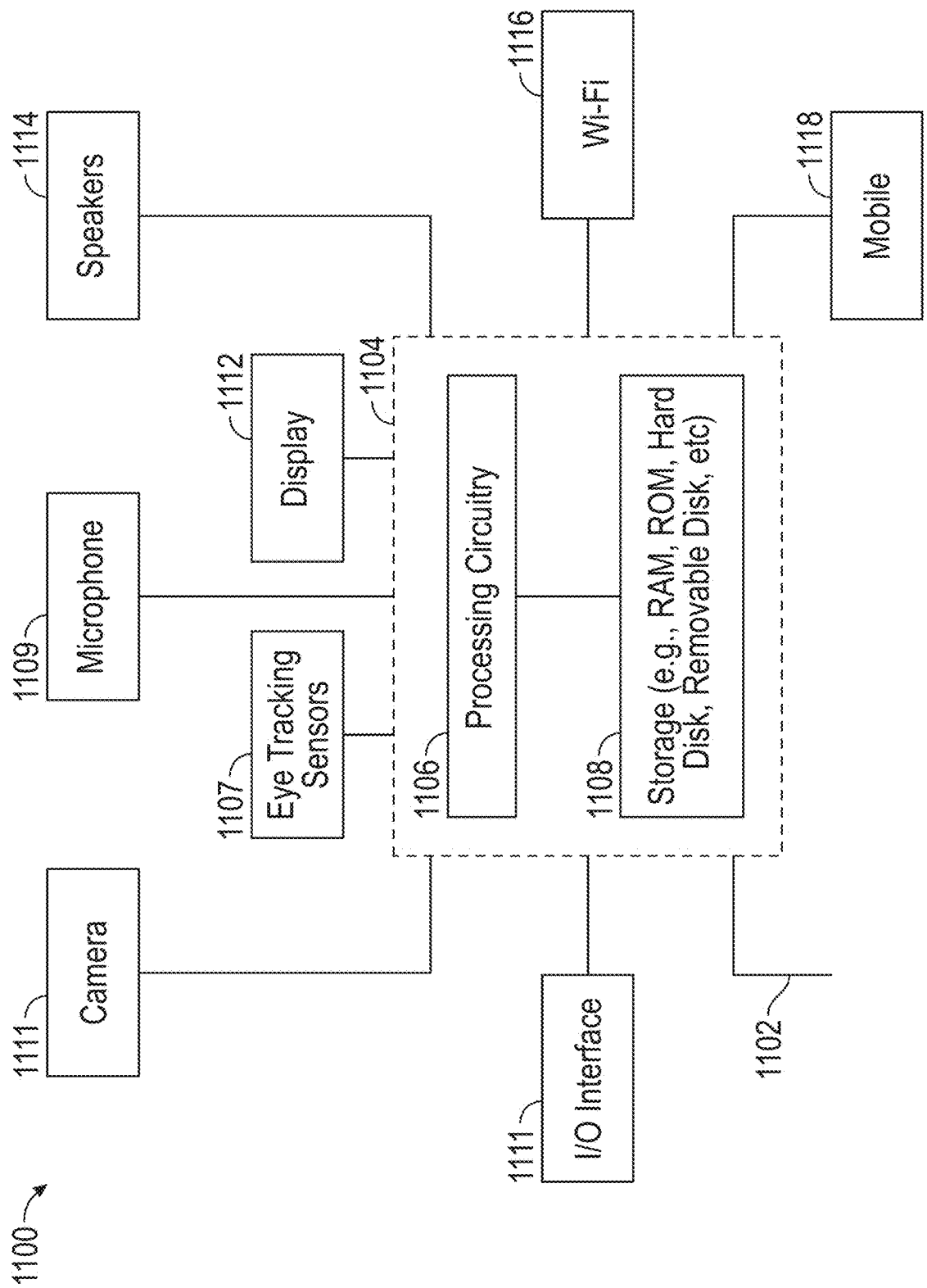

SYSTEMS AND METHODS FOR ENHANCING SPEECH AUDIO SIGNALS

BACKGROUND

This disclosure relates to enhancing audio speech signals of a speaker in a noisy environment. In particular, techniques are disclosed for identifying and enhancing audio signals of a speaker based on a user's determined direction of gaze and image analysis of a user environment.

SUMMARY

It can be challenging for many individuals to hear conversational speech in crowded and noisy environments, such as social gatherings in confined spaces, loud restaurants, and the like. In particular, individuals with hearing loss or impairments often struggle to make out voices in conversations that take place with loud background environmental noise. Focusing on speech of a particular individual in settings with multiple speakers talking simultaneously or with significant background noise can be challenging. Affecting those with normal hearing in addition to individuals with hearing loss, this obstacle is known as the "cocktail party effect," where the auditory processing ability of a person is limited when attempting to focus on a single voice while filtering out other voices and environmental sounds.

A number of technological solutions have been suggested. Electronic hearing aids are designed to amplify surrounding voices and sounds, but are not designed to identify, distinguish, or enhance one voice out of many. In some embodiments, a wireless connection between headphones of a listener and a microphone placed close to a speaker can prove helpful. However, this requires the microphone or a similar recording device be placed physically close to a first speaker, which may be cumbersome or inaccessible. Additionally, if the conversation shifts to a second speaker in a different location, the microphone must be physically relocated to be close to the second speaker in order to continue receiving high quality speaker audio.

Another technological solution involves the use of a microphone array configured to use beamforming techniques to focus on a specific audio source from a distance. In practice, however, implementing a sufficiently narrow audio pickup angle for most microphones is difficult and microphones that are capable of very narrow pickup angles, such as shotgun microphones often used in video production, are large and cumbersome. In some solutions, an orientation of a user is determined and used to identify a source of audio. However, in capturing audio in a confined space with many speakers, e.g., in a conversation among many people at a restaurant table, it is challenging to accurately direct a microphone to differentiate between adjacent speakers based on orientation alone. Additionally, capturing an image of a user environment and implementing image analysis to identify an active speaker can require a significant amount of processing power to efficiently determine one active speaker out of a larger group of speakers. This disclosure addresses these shortcomings.

In the disclosed embodiment, the direction of a user's gaze is determined and used to identify an active speaker, and audio signals from the identified active speaker are focused on, e.g., using beamforming algorithms, and enhanced. Image sensors, e.g., cameras mounted on an interior of a pair of glasses, are used to capture images of the eyes of a user to determine a user gaze direction. Additional cameras pointed away from the user are configured to capture sequential images and/or video of a user environment in front of the user, and, based on the gaze direction and captured environment sequential images or video, a current active speaker is determined. Spatial audio is captured using a microphone or microphone array. Based on the gaze direction and captured images or video, audio of the active speaker is focused on, e.g., by adjusting microphone sensitivity using beamforming algorithms. The audio can be identified as speech of an active speaker, and is presented to the user in an enhanced format.

In an embodiment, speech enhancement is performed on audio signals received from the active speaker, for example by using a machine learning model, in order to enhance the active speaker audio. When audio of the active speaker is identified, the spatial audio is played back to a user, e.g., using headphones or speakers, where volume of the environmental audio, such as background noise, is reduced and/or volume of the active speaker audio is increased.

In a further embodiment, video images of the active speaker are captured and analyzed to perform voice separation and generate a refined voice signal. This refined voice signal is used as input into an automatic speech recognition function to produce more accurate text output of the active speaker's speech. In some embodiments, machine learning models are implemented to enhance the text output. Additionally, an enlarged video stream of the active speaker's mouth may be displayed, such as on a screen or projector of a pair of extended reality (XR) glasses, to assist a user in understanding the active speaker's speech. This allows a user to perceive subtle facial expressions and movements of the speaker's mouth to increase comprehension of the speaker.

In a further embodiment, enhanced audio is produced in conjunction with XR glasses, where the XR glasses are equipped with cameras configured to capture images of the eyes of the XR glasses user. The XR glasses further include forward-facing cameras configured to capture sequential images and/or video of the user environment, and one or more audio outputs to playback enhanced speaker audio. Generally speaking, references herein to an "XR device," "audio enhancing device," or "XR glasses" refer to a device providing virtual reality (VR), mixed or merged reality (MR), or augmented reality (AR) functionality (e.g., wherein virtual objects or graphic overlays are provided in addition to real-world objects or environments visible via the device). An XR device may take the form of glasses, e.g., "XR glasses," a headset, or devices having similar configurations.

In a further embodiment, sequential images and/or a video stream are input into a machine learning model configured to accurately identify an active speaker audio, and separate the active speaker audio from surrounding background noise.

In a further embodiment, the automatic speech recognition is run on a remote server where the captured audio and/or video stream are analyzed by a machine learning model. This way of implementing the machine learning model may be more energy efficient for battery-powered devices (e.g., portable XR glasses), as the model can run on more powerful remote servers without requiring the portable user device to focus on power or battery optimization.

In a further embodiment, the automatic speech recognition is used to generate captioned text of the active speaker, which is displayed on the screen or projector of the XR glasses.

In a further embodiment, the volume level of the active speaker audio, or certain frequencies of the active speaker audio, are increased. For example, based on a personalized user audiogram, the volume level of different audio frequencies of the active speaker audio are adjusted differently.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

FIG. 11 is a block diagram showing components of a device for enhancing target voice audio, in accordance with some embodiments of the disclosure.

DETAILED DESCRIPTION

Figure 1:
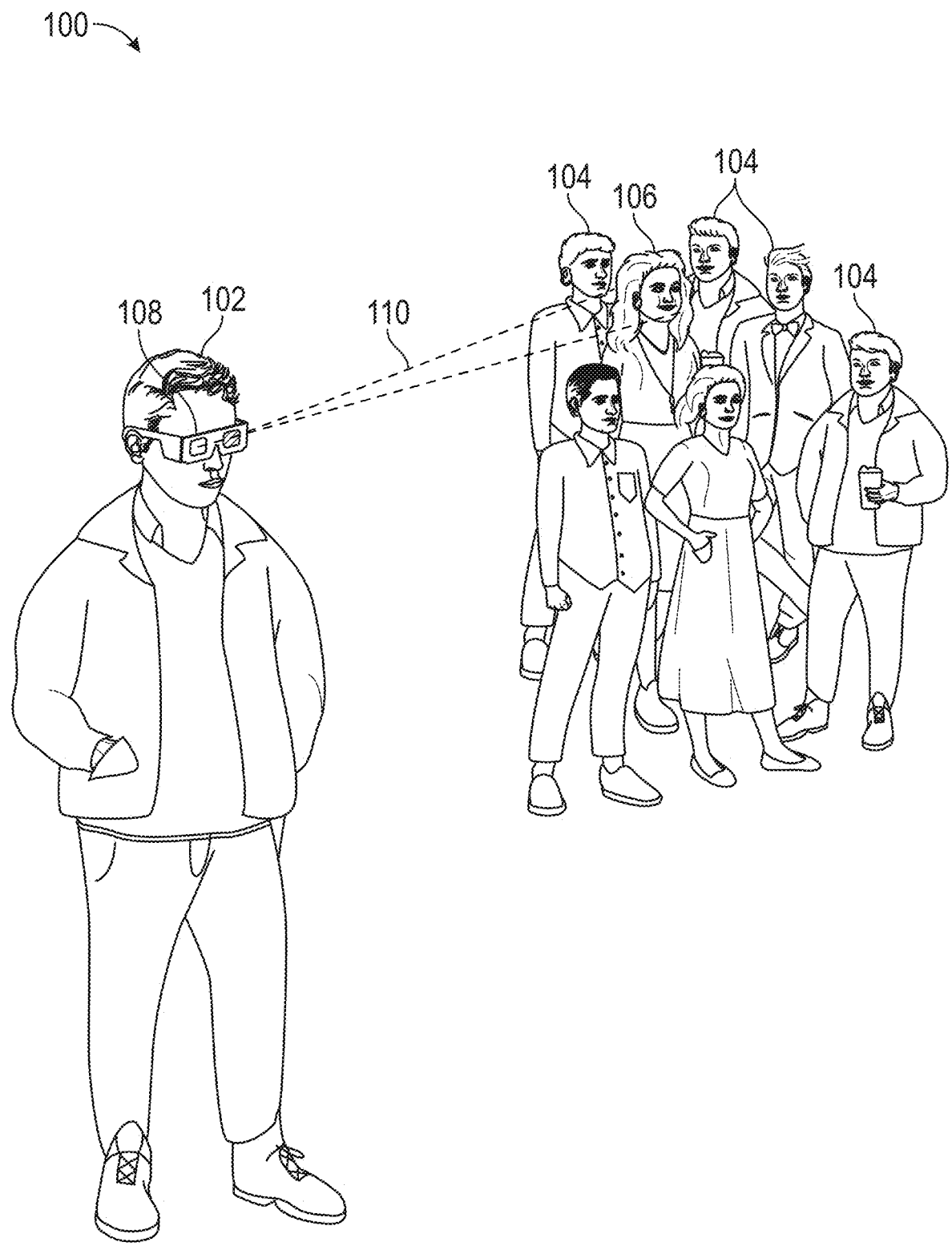
FIG. 1 shows an illustrative diagram of a user with an audio enhancing device in a noisy environment, in accordance with some embodiments of the disclosure.

FIG. 1 shows an illustrative diagram of a user with an audio enhancing device in a noisy environment 100, in accordance with some embodiments of the disclosure. A user 102 is shown in a crowded environment 100, which includes a plurality of individuals 104 standing in close proximity to each other. The proximity of individuals in a confined space, particularly in a loud setting, such as a bar or restaurant where many people may be involved in conversations, presents a challenge in discerning a particular voice of one speaker out of many.

In the disclosed embodiment, the user 102 is wearing a pair of extended reality (XR) glasses, discussed in further detail below with reference to FIGS. 3A-3B and 11. The XR glasses 108 are configured to determine a user gaze direction 110, and use the determined user gaze direction 108 along with captured sequential images and/or video of the speakers 104 in the crowded environment, to identify an active speaker 106 from the speakers 104 that the user 102 is focusing on and enhance audio of the active speaker 106 as further discussed herein.

A user gaze direction is the direction toward which one or both of the eyes of a user are aiming, and may be represented by a vector, an angle with respect to a reference axis, e.g., a polar angle, a line having a point of origin at the pupil of an eye of the user and an end point at the lips of a speaker, and the like. As discussed further herein, in an embodiment, the position of the user's eye or eyes is determined based on eye tracking sensor images captured from eye tracking sensors, and the position of the lips of a speaker is determined by analyzing captured images of a user environment and/or data provided by a user device, e.g., an orientation sensor of pair of XR glasses.

As an non-limiting example of the present disclosure, a user may be seated in a noisy restaurant across from ten individuals. Using generic orientation data alone as input, e.g., determining the orientation in 3D space of a pair of XR glasses worn by the user, a determination is made that five out of the ten individuals are likely active speaker candidates that the user is presently interested in listening to. Taking into account the user gaze direction in place of, or in addition to, the generic orientation data may reduce the number of likely active speaker candidates from five to three. Further applying an image analysis of captured environmental images, e.g., feeding the captured environmental images as input into a machine learning algorithm, may further reduce the number of likely active speaker candidates to a single individual, who is then determined to be the current active speaker. In an embodiment, the machine learning algorithm applies an attention model to focus specifically on visual features of a speaker's lips to assist in analysis of the active speaker audio. The machine learning model may include artificial intelligence (AI) and deep learning models configured for human facial analysis. In another embodiment, the image analysis is performed on captured environmental images to detect all potential active speaker candidates within an image frame, a user gaze direction is determined and used to reduce the number of active speaker candidates further, and finally a machine learning algorithm is implemented to determine most likely active speaker candidate.

Figure 2:
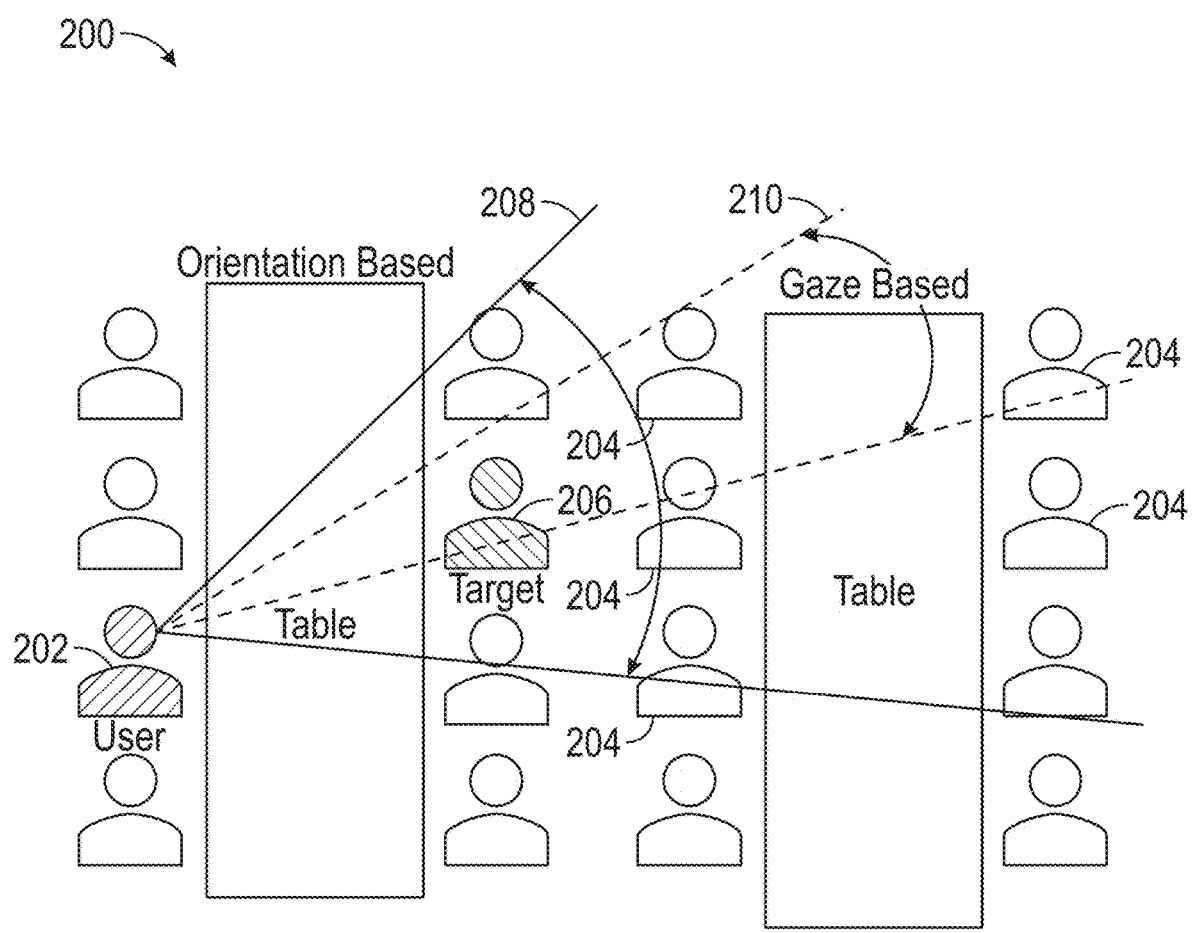
FIG. 2 shows a gaze-based angle and orientation-based angle for capturing audio in a crowded environment, in accordance with some embodiments of the disclosure.

FIG. 2 shows an illustrative diagram of a gaze-based angle and orientation-based angle for capturing audio in a crowded environment 200, in accordance with some embodiments of the disclosure. A user 202 is situated among a plurality of other individuals 204, facing toward a direction of a section of the crowded environment 200. A hearing aid device may be used to capture and enhance environmental audio. For example, individuals that are hard of hearing may wear an ear mounted hearing aid or use a microphone and headset to listen to enhanced audio signals from their surrounding environment.

Microphones and other audio sensors used to capture audio signals may have inherent directivity, namely a distribution of sensitivity to detect audio signals within three dimensional space. For example, certain microphones may have an omnidirectional pattern for picking up audio signals evenly within a spherical volume. Other microphones may have more directional pickup, such as cardioid and subcardioid polar pattern with frontward weighted sensitivity. Other directional patterns include supercardioid, hypercardioid, FIG. 8, and shotgun, each of which limit lateral audio pickup from the sides of a microphone, and enhance signals originating from in front and in back of the microphone. The shotgun pattern in particular focuses on a narrow forward-weighted area of audio sensitivity. Microphones that have a shotgun pattern must be directed accurately toward an audio source to capture the desired audio signal. The inherent directivity of a microphone cannot be adjusted or steered programmatically; it must be physically steered towards the desired direction. On the other hand, beamforming technology using microphone array can be adjusted and steered programmatically.

Some hearing aid devices are configured to determine an orientation that a user 202 of the device is facing, e.g., using accelerometers, gyroscopes, compasses and the like. However, an orientation-based angle 208 determined from the general direction that a user is facing can often be too large to be useful in focusing audio pick up on a single speaker, and will include many other individuals 204 that are not the desired focus of the user. A gaze-based angle 210 is narrower than the orientation-based angle 208, and limits the possible audio sources to allow for a more accurate focus on a desired speaker 206.

In an embodiment, an audio enhancing device may include a plurality of microphones forming a microphone array, which can be configured to select one of many polar patterns determined to best suit a given setting. Thus, a single microphone array can apply certain delay and amplification adjustments on each microphone such that the total summation of all microphones will amplify the sound from a desired direction and suppress the sound from other undesired directions. In this way, the directivity can be adjusted and steered programmatically. In an embodiment, a microphone array is configured to be able to capture audio from a select portion of a full 3D sound field.

Figure 3A:
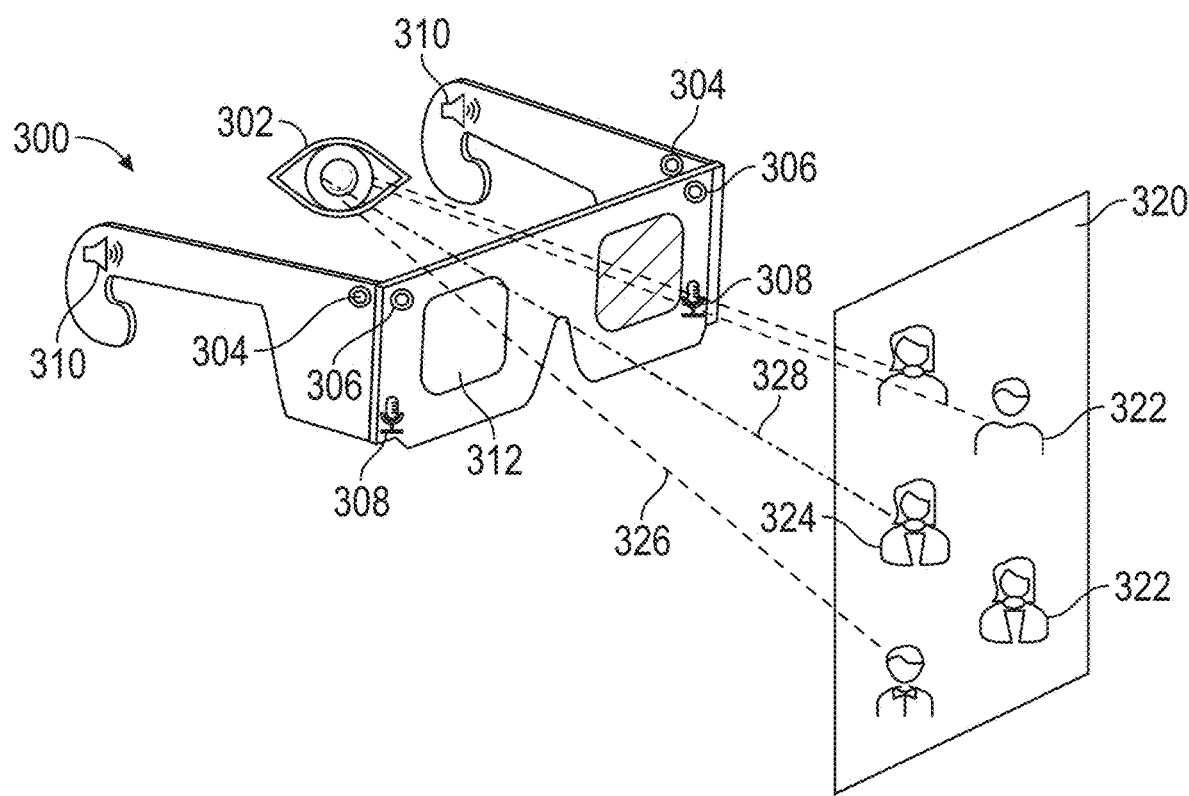
FIG. 3A shows a diagram of a pair of extended reality (XR) glasses for enhancing speaker audio, in accordance with some embodiments of the disclosure.

FIG. 3A shows a diagram of a pair of extended reality (XR) glasses 300 for enhancing speaker audio, facing a plurality of individuals, in accordance with some embodiments of the disclosure. XR glasses are a type of wearable technology with a number of components configured to overlay digital information onto a live view of the current environment in which a user is located, and allow the user to interact with an AR environment. The disclosed XR glasses include of a number of components for capturing audio and generating enhancing audio based on a determined user gaze direction, including eye tracking sensors 304, a camera or camera array 306, a microphone or microphone array 308, one or more displays 312, and an audio output device 310. In an embodiment, the XR glasses further include an orientation sensor, a gyroscope, a compass, or a similar sensor (not shown) configured to determine a direction in which the XR glasses are oriented within 3D space.

In an embodiment, the eye tracking sensors 304 include a camera and an infrared light source. The eye tracking sensors 304 are mounted to an interior of the frame of the XR glasses 300. The camera captures closeup images of the eyes of a user, and the infrared light source illuminates the eyes, making each eye more visible to the camera. When a user looks at an object, their eyes reflect the infrared light back toward the tracking sensor camera. The tracking sensor camera captures image of the user's eyes, and analyzes the reflection of the infrared light. The images are processed, e.g., by a processing circuitry included within the XR glasses, to track and identify a current orientation and direction of the user's eyes, and determine a gaze direction of the user at a specific point in time.

In an embodiment, computer vision algorithms and/or machine learning models are used to determine the gaze direction. The computer vision algorithms and/or machine learning models may employ pattern recognition and feature extraction techniques to identify the iris, pupil, and other features of the eyes, which are used to determine the position and orientation of the iris and pupil and determine a current gaze direction. In a further embodiment, images of the user's eyes are sent to a remote server, e.g., over a network via a network interface (not shown), configured to determine the gaze direction, which is then transmitted back to the XR glasses.

In an embodiment, the gaze direction is determined using a combination of geometric calculations and statistical models, which take into account the shape and size of the user's eyes, the distance between the eyes and the camera, and other factors. These algorithms are configured to track the user's eye movements with high accuracy, and therefore can determine an accurate gaze direction.

The gaze direction is used as an input to assist in determining a target speaker to whom a user intends to listen. In an embodiment, the target speaker is identified by calculating an intersection of the eye gaze direction and one or more targets visible within the image captured by the front-facing camera of the XR glasses, and a machine learning model is implemented to select a most likely candidate of as a target active speaker.

A field of vision 320 is visible to the user, e.g., a scene visible from the eyes 302 of the user, through the lenses of the XR glasses 300. The field of vision may include a desired, or active, speaker 324, and one or more secondary speakers 322 that are not determined to be active speakers. Lines of sight extend from the active speaker 324, line of sight 328, and non-active speakers 322, line of sight 326, to the eye or eyes 302 of the XR glasses user. In an embodiment, the eye tracking sensors 304 of the XR glasses are used to determine and locate the line of sight 328 from the user to the active speaker 324.

Figure 3B:
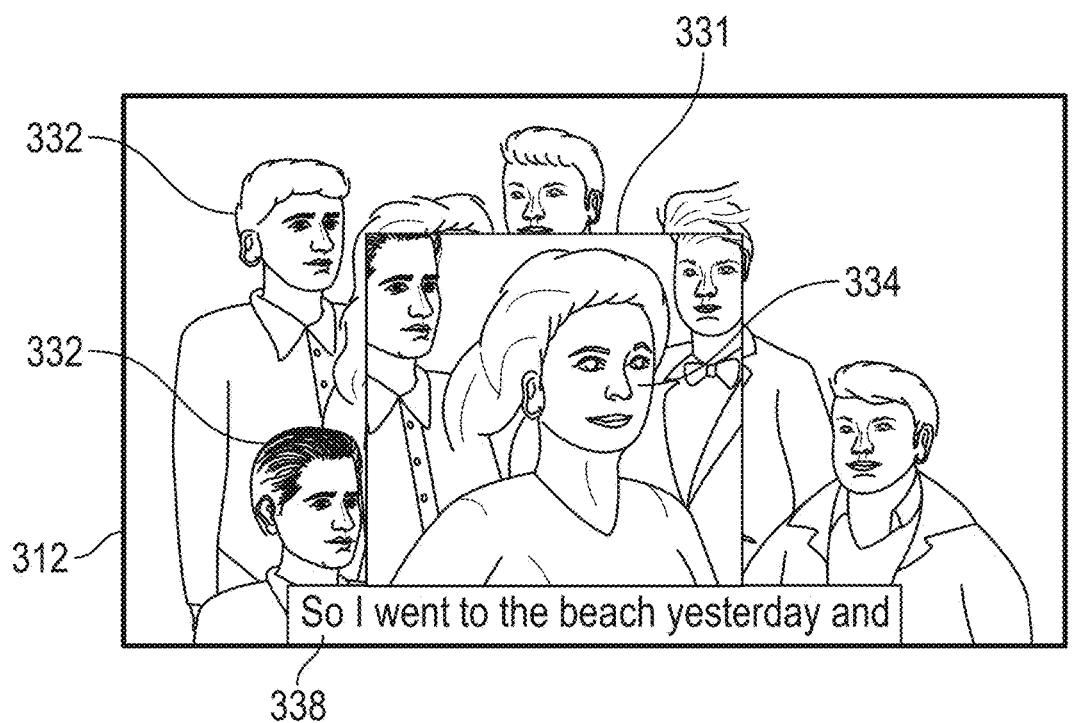
FIG. 3B shows an illustrative diagram of a display of XR glasses for enhancing speaker audio, in accordance with some embodiments of the disclosure.

FIG. 3B shows an illustrative diagram of a display 330 of XR glasses for enhancing speaker audio, in accordance with some embodiments of the disclosure. The display 312, is configured to show a digital image of a user environment in the direction that a user if facing. In a further embodiment, the display 312 is configured to be semi-transparent, thus allowing a user to see directly through a lens of the XR glasses, while also having a semi-transparent display projected within the user's vision.

In an embodiment, the display 312 show a group of speakers, including an active speaker 334, and one or more non-active, or secondary, speakers 332. It should be noted that the term active speaker referenced herein refers to a speaker that the user of the XR glasses is determined to have a gaze directed thereto, and non-active speaker are speakers within the user environment that have been determined to be of secondary interest, or that the user gaze is not directed thereto. There may be periods of time when the active speaker is silent and the non-active speakers are talking, e.g., mid-conversation, while the label of the active speaker remains related to a single person and does not switch. If the active speaker is determined to no longer be of interest to the user, e.g., a period of time has passed without the active speaker talking, and/or if the user is determined to have shifted their gaze toward a second speaker, the second speaker may be assigned the active speaker designation, and the previous active speaker may be assigned a secondary speaker designation.

In an embodiment, an area 331 around the active speaker 334 is enlarged to allow the user of the XR glasses to have an enhanced view of the active speaker 334. In particular, lip movements of an active speaker can assist a user in understanding and interpreting the words being spoken by the active speaker, and therefore an enlarged view of the active speaker's lips provides additional aid in comprehending the speaker's words.

In a further embodiment, a caption area 338 is provided within the enhanced display, e.g., underneath the enlarged area showing the active speaker 334, to further assist a user in understanding the words of the active speaker 334. Text captions may be generated based on the audio signals and lip movements of the active speaker 334 capture by the XR glasses, as further discussed herein.

Figure 4:
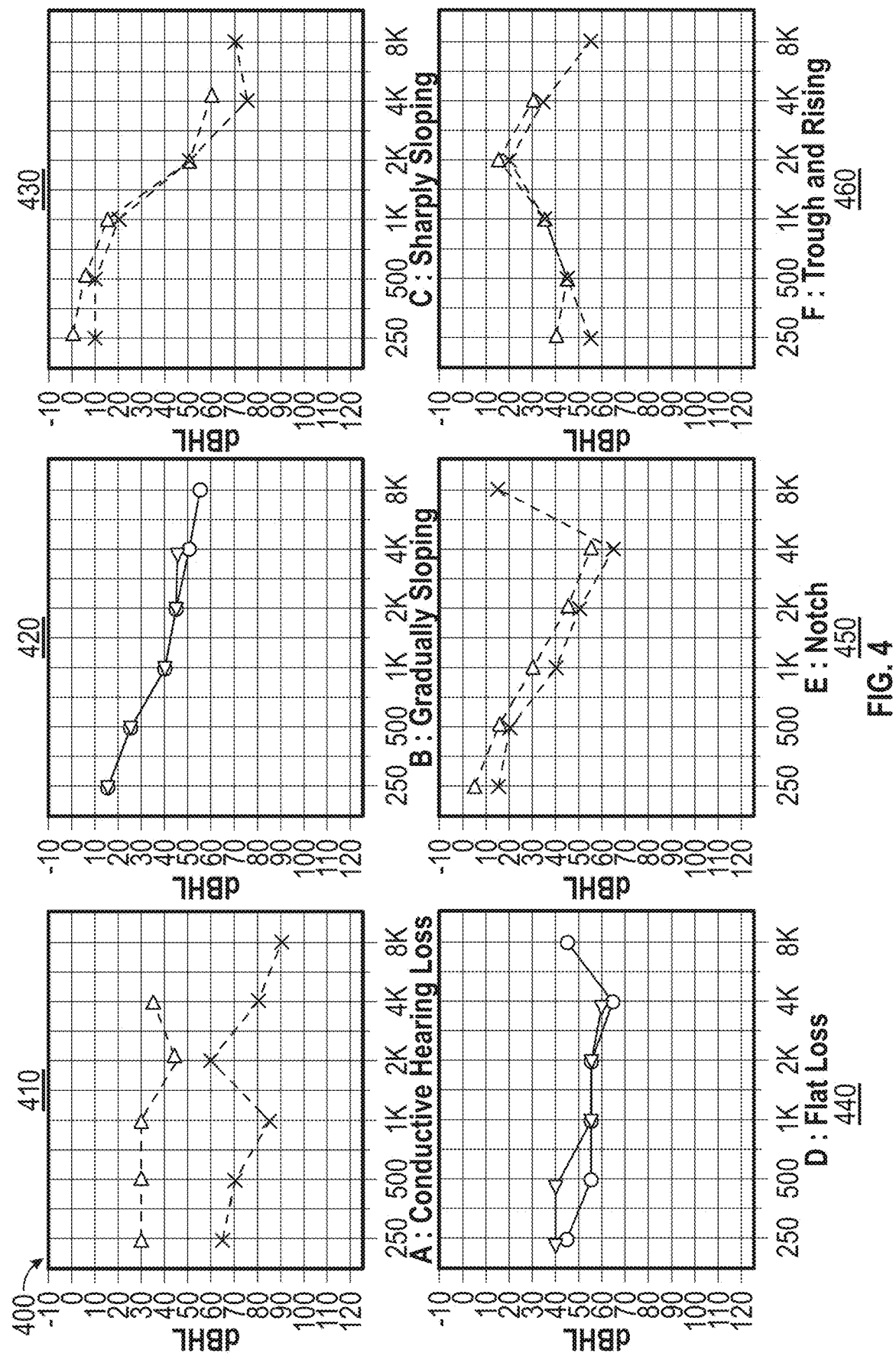
FIG. 4 shows graphs displaying levels of audio frequency response of various individuals, in accordance with some embodiments of the disclosure.

FIG. 4 shows graphs 400 displaying levels of audio frequency response of various individuals, in accordance with some embodiments of the disclosure. Many individuals suffering from hearing loss do not experience a loss across all frequencies equally. Thus, individuals suffering from conductive hearing loss, represented by graph 410, gradual sloping loss 420, sharply sloping loss 430, hearing loss represented as an audiometric notch 450, and hearing loss represented as trough and rising 460 each have differing levels of hearing loss across the range of frequencies within the human range. Therefore, a mere adjustment of overall volume level would be insufficient in providing comprehensive hearing aid to such individuals. Simple volume augmentation would only be appropriate for individuals experiencing flat loss, represented in graph 440. Thus, in addition to directional filtering, individualized frequency adjustment may be provided in the disclosed embodiments as well.

Figure 5:
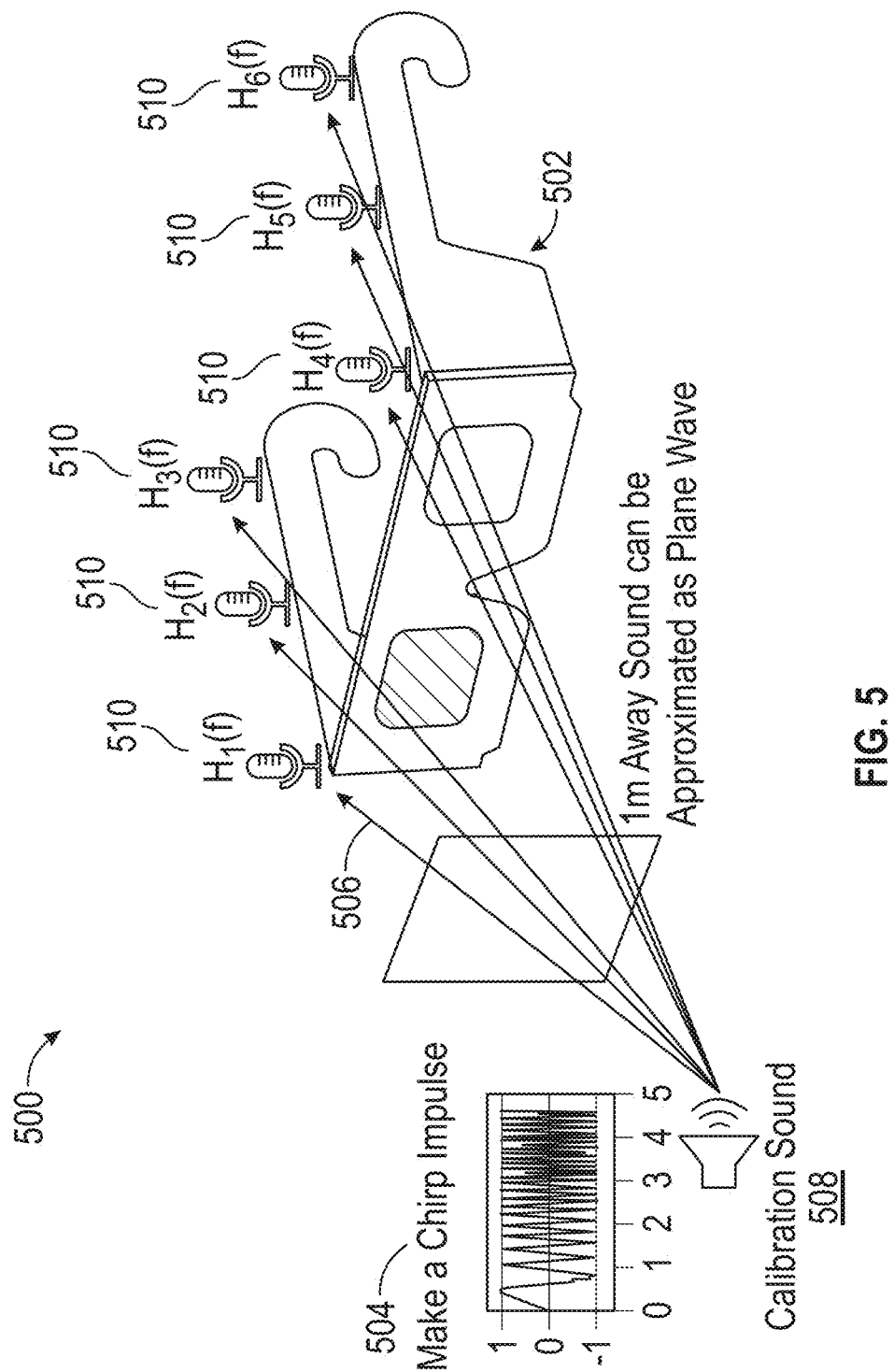
FIG. 5 is a diagram of a calibration process of XR glasses for enhancing speaker audio, in accordance with some embodiments of the disclosure.

FIG. 5 is a diagram 500 of a calibration process of XR glasses 502 for enhancing speaker audio, in accordance with some embodiments of the disclosure. The calibration process includes playing a known calibration sound 508, such as a particular type of chirping sound, and receiving and analyzing the calibration sound via an array of microphones 510 located at various known locations on the XR glasses 502.

Spatial audio is a type of audio that captures the position (e.g., represented by 3D coordinates), movement (e.g., represented by changes in 3D coordinates of a position of audio signals within a 3D space, changes in audio signal acceleration or speed, and the like), and other spatial characteristics of sounds in an environment. Spatial audio is typically captured using a microphone array, such as the array comprising microphones 510, positioned at different locations on the XR glasses. The microphone array uses advanced signal processing algorithms to combine the captured audio signals from different microphones into a single, spatialized audio signal. In an embodiment, a beamforming algorithm is determined based on the audio signals received at each microphone 510 of the microphone array.

Beamforming algorithms are processing algorithms that emphasize signals originating from a particular direction while attenuating signals origination from other direction and is used to enhance a signal-to-noise ratio and reduce unwanted signals. Beamforming algorithms can also be implemented to determine a direction of arrival of an audio signal. Beamforming algorithms include low power beamforming algorithms, namely algorithms that perform beamforming calculations quickly and efficiently, and high power beamforming algorithms, which may produce more accurate results, but are more power and resource intensive.

An example of low power beamforming designed to reduce the computing resources required for beamforming calculations includes calculating the dot product of a vector of a received audio signal and an expected direction of the received signal, thus reducing the audio signal strength in proportion to how divergent the received audio signal is from the expected direction. Such a fast algorithm is more efficient, requiring lower computer power and therefore more easily implemented into battery powered consumer wireless equipment as opposed, e.g., to enterprise-grade wired hardware. An example of high power beamforming includes time domain beamforming and frequency domain beamforming, which may be implemented with various designs, including, but not limited to minimum variance distortionless response (MVDR), maximum signal-to-noise ratio (MSNR), minimum mean-squared error (MMSE), and linear constraint minimum variance (LCMV).

The calibrated microphone array is further configured to use beamforming to separate the audio signals from different directions. This is achieved by applying delays and gains to the audio signals from each microphone, based on the calibration process, such that the signals from a particular direction are reinforced and the signals from other directions are minimized or canceled. In an embodiment, to create more accurate results from the beamforming algorithms, the positioning of the microphones on each individual user wearing a pair of XR glasses is determined and used to enhance the precision with which the beamforming algorithms are applied, as the positioning of each microphone is used in determining the output audio signal.

With limited microphones and form factors able to be included within a single pair of XR glasses, beamforming alone will often not provide enough directivity to suppress all sound from unwanted directions. However, the beamforming algorithm is sufficient in identifying sound signals from the direction of the target person, i.e., an active speaker, which can be captured with maximum gain. In an embodiment, fast or simple beamforming is implemented for computational efficiency, which can extend the battery life and operational time of a portable device, e.g., a pair of XR glasses.

As shown in FIG. 5, an illustrative six microphones are positioned along the two temples of the XR glasses. To determine a beamforming algorithm for a microphone array of a pair of XR glasses, the XR glasses are calibrated using a chirp impulse from various calibration directions in front of the glasses where a user could potentially be looking at. For each direction from which a calibration impulse is sent, the impulse response received on each microphone will be captured and stored as the following vector:

$$H(\theta) = [H_1(f), H_2(f), H_3(f), H_4(f), H_5(f), H_6(f)]$$

Figure 6:
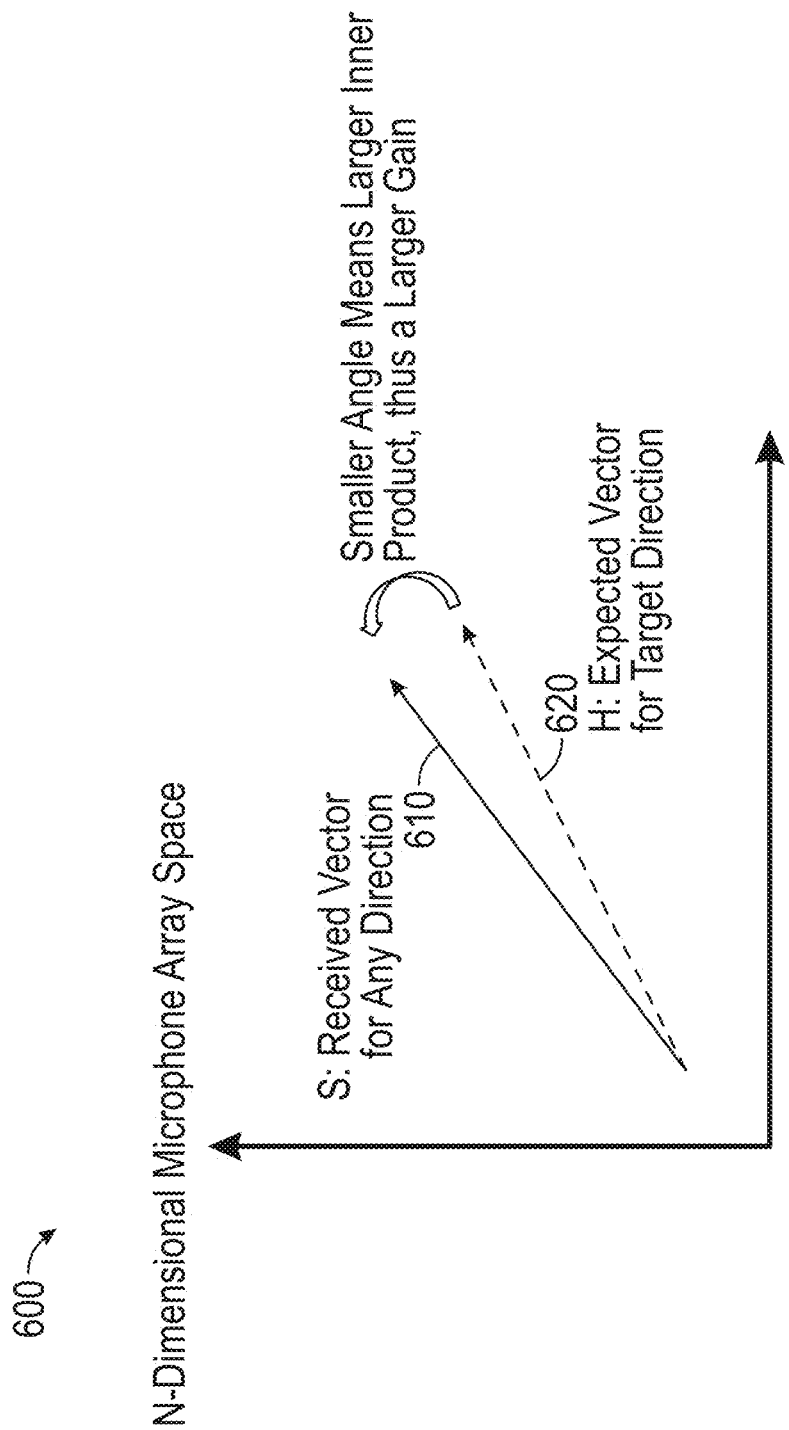
FIG. 6 is a graph representing adjustment of an audio vector, in accordance with some embodiments of the disclosure.

The vector can then be applied to received audio signals when the XR glasses are in use, as discussed further regarding FIG. 6. This vector may be the result of a fast beamforming algorithm.

FIG. 6 is a 600 graph representing adjustment of an audio vector, in accordance with some embodiments of the disclosure. In use, sound from an active speaker in an environment is captured, and may be identified as originating from a direction similar to a calibration direction. The component of the received vector 610 of audio that matches a vector of audio from an expected target 620, e.g., based on a user gaze direction or image analysis as discussed further herein, be amplified and a gain will be applied. The component of the received vector 610 that does not match the expected target vector 620 will be attenuated, and therefore audio originating from directions other than the expected target direction will be suppressed.

Figure 7:
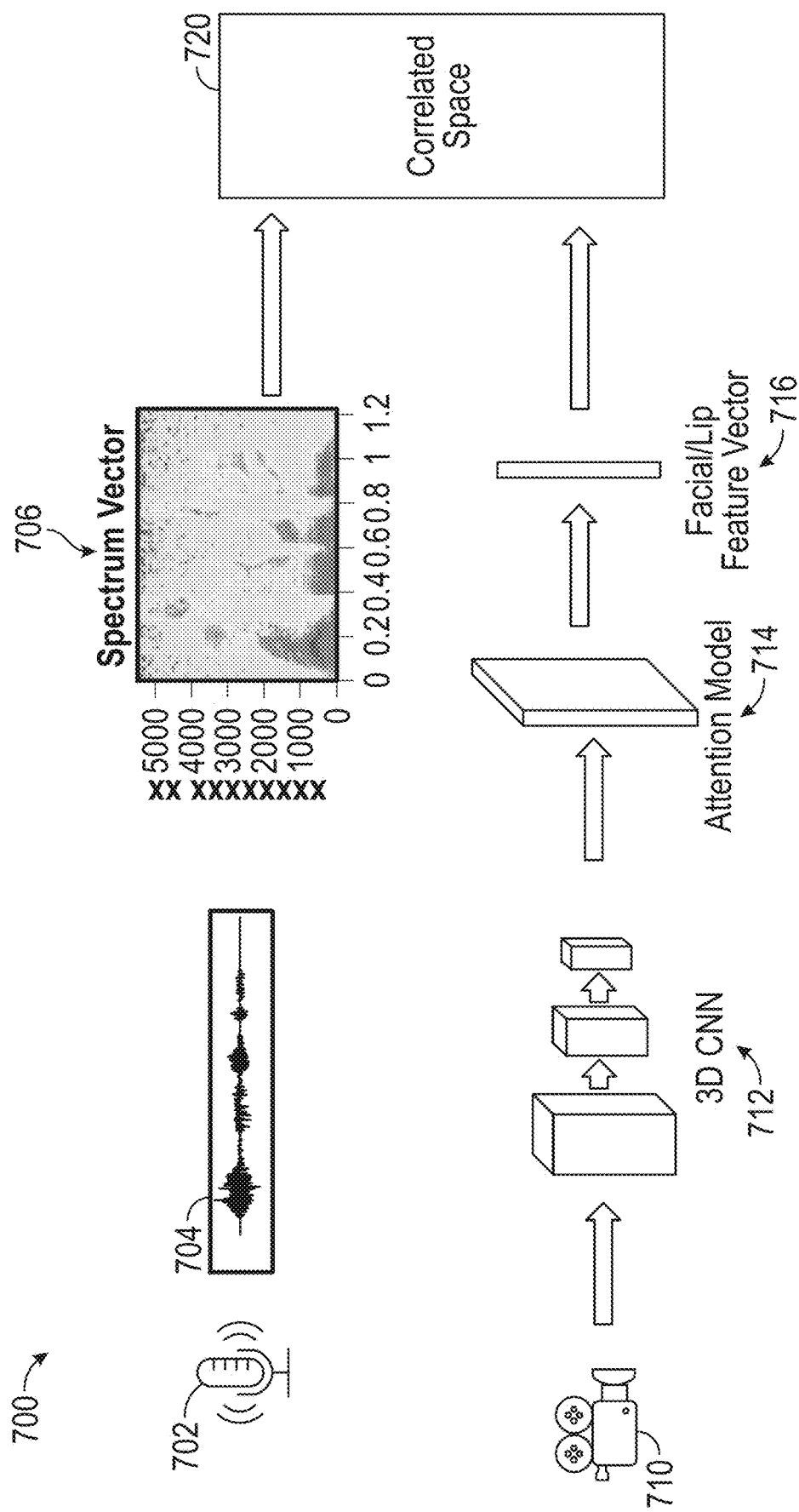
FIG. 7 is a diagram of a training process for correlating voice audio with facial images, in accordance with some embodiments of the disclosure.

FIG. 7 is a diagram 700 of a training process for correlating voice audio with facial images, in accordance with some embodiments of the disclosure. Lip reading is a tool that can be used for speech recognition. Implementing lip reading using image recognition of the lips of a speaker together with audio analysis of the speaker's audio allows for identification of an active speaker's voice from noisy background sounds, including speech from nearby individuals. The identification of the active speaker's voice is further enhanced when using a determined user gaze direction to focus on a limited number of potential active speaker candidates.

In an embodiment, audio signals are captured from an environment, e.g., via a microphone 702 or a microphone array, such as the microphone array 308 of FIG. 3 or 510 of FIG. 5. The audio signals are received and analyzed, e.g., by graphing parts of speech, e.g., captured within a gaze direction of a user, within the audio signals 704 over time and determining a spectrum vector 706 of the received audio signals. The analyzed audio signals and corresponding spectrum vectors are stored within a correlated space 720.

In addition to the captured audio signals, a video of an active speaker is concurrently received, such as capturing a video stream of the speaker's face by a high resolution camera 710. The captured video is input into a machine learning model, such as a convolutional neural network (CNN) 712 optimized for image recognition, and using the CNN and/or computer vision, the speaker's lips are detected and tracked in the video stream. This can be done by implementing one or more techniques such as face detection, feature extraction, pattern recognition, and the like. In an embodiment, the CNN implements an attention model to focus specifically on the visual features of the speaker's lips, such as the shape, size, and movement of the lips, which are extracted and used to create a visual representation of the speaker's mouth and lips. In an embodiment, a lip vector of the speaker 716 is created and then stored within the correlated space 720. The stored lip vector can be accessed at a future point in time to identify an active speaker and determine if an active speaker has changed based on an analysis of received audio signals and environmental images using the stored lip vector.

Thus, the correlated space 720 is based on both the facial or lip vector 716 and the audio spectrum vector 706 and can be used to train a deep learning model to correlate the voice and lip motions. The correlated space is stored for future use e.g., within a remote server or within a memory of a local device, such as the XR glasses. The correlated space may be referenced when future incoming sound signals and simultaneous video feed are received to accurately identify an active speaker's speech and distinguish the active speaker's speech from other environmental sounds. In one embodiment, a model of a speaker's voice is used to separate speech from background noise, and to filter out secondary speaker's speech audio signals. This can be done using techniques such as spectral subtraction, Wiener filtering, adaptive filtering, and the like. In a further embodiment, identification of a speaker is based on audio or visual cues. An active speaker's voice may be used to determine if the active speaker's specific voice model is available, and if so, the active speaker's speech is used to update the voice model. If the active speaker's specific voice model is not available, a voice model most compatible with active speaker is determined and used, and a model for the active speaker may be created and stored for future use.

Figure 8:
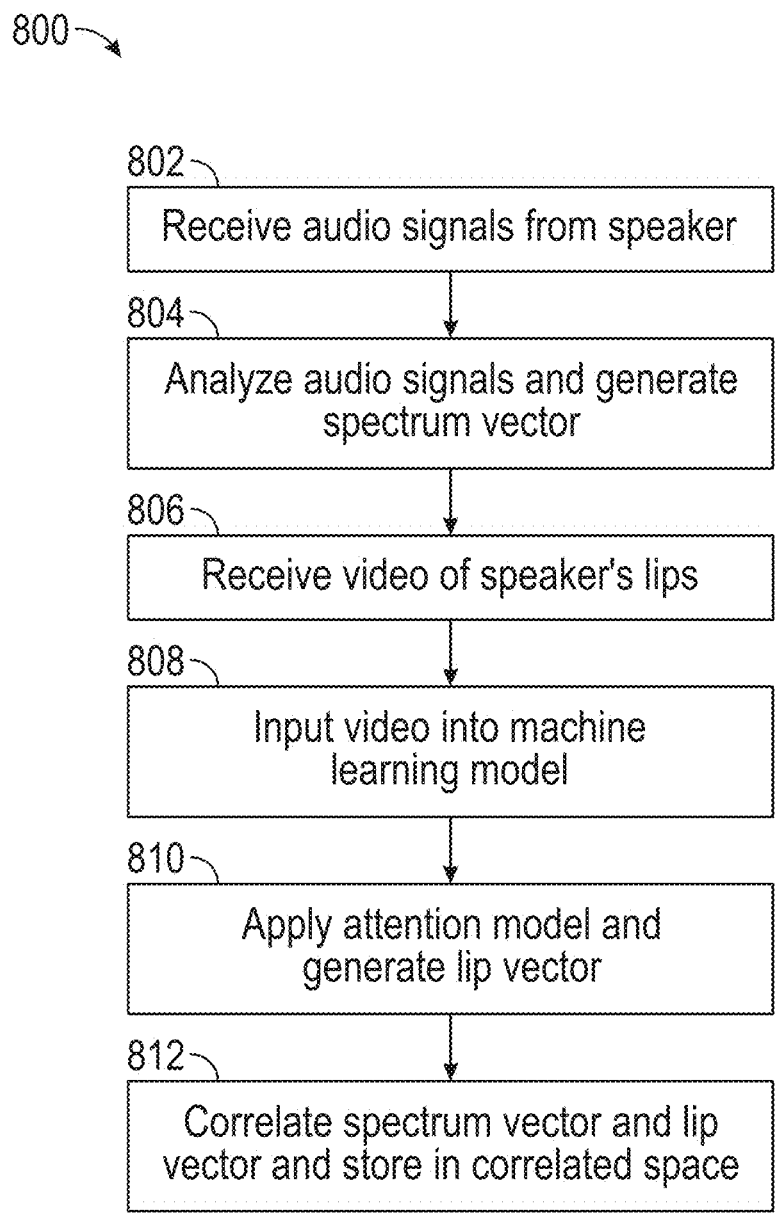
FIG. 8 is a flowchart of a training process for correlating voice audio with facial images, in accordance with some embodiments of the disclosure.

FIG. 8 is a flowchart representing an illustrative training process 800 to correlate lip movement with audio signals, in accordance with some embodiments of the disclosure.

At step 802, audio signals are received. In an embodiment, the training process includes a receiving a plurality of audio signals from a plurality of speaking individuals. The audio signals are received via a microphone, e.g., through a microphone array.

At step 804, the received audio signals are analyzed. In an embodiment, the analysis includes determining the beginning and end of word or phrase being spoken by the speaking individual. The analysis may include graphing the audio signals to determine the change and level of amplitude and distinguish one word or phrase from the next word or phrase. A spectrum vector is generated based on the analyzed audio signals.

At step 806, a video stream of the speaker's face, mouth, and/or lips is received. At step 808, the received video stream is input into a machine learning model, such as a CNN, and at step 810, an attention model is applied, e.g., via the machine learning model, and a lip vector is generated. The attention model is configured to focus specifically on the visual features of the speaker's lips, such as the shape, size, and movement of the lips, which are extracted and used to create a visual representation of the speaker's mouth and lips. In an embodiment, the machine learning model is configured to determine an area of focus and associate relevant parts of subsequent images, e.g., a speaker's lips, without additional attention model input.

At step 812, the spectrum vector and the lip vector are correlated with each other and stored within a correlated space.

Figure 9:
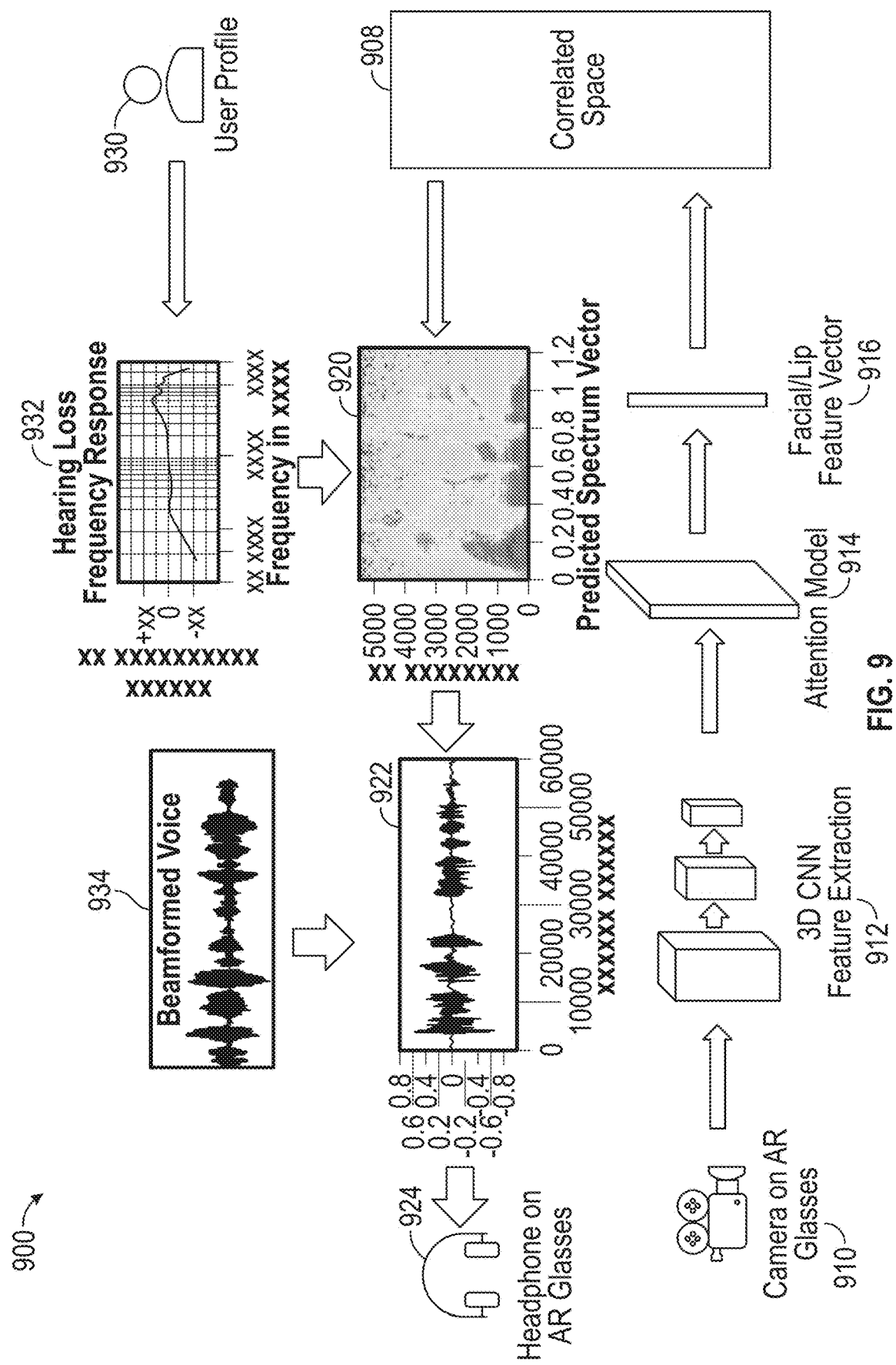
FIG. 9 is a diagram of a process of using facial images to enhance a target voice, in accordance with some embodiments of the disclosure.

FIG. 9 is a diagram of a process for using facial images to enhance a target voice, in accordance with some embodiments of the disclosure. Implementing the trained machine learning model discussed above in FIG. 7, a video of an active speaker is captured, e.g., using a high-resolution camera 910 mounted onto a pair of XR glasses, such as XR glasses 108 of FIG. 1, 300 of FIG. 3, and 502 of FIG. 5. The camera is configured to capture a video stream of an active speaker's mouth and lips. The video stream is fed into a CNN 912 for feature extraction, where an attention model 914, configured to focus on the active speaker's face, mouth and/or lips, is applied to images of the video stream. A facial and/or lip vector 916 is generated and input into the correlated space.

In an embodiment, a user profile 930 is retrieved. The user profile is associated with the user of an audio enhancing device, such as XR glasses 108 of FIG. 1, 300 of FIG. 3, and 502 of FIG. 5. The user profile include data related to the individual user, such as a hearing loss frequency response 932, e.g., based on an audiogram, which includes information regarding the personalized frequency sensitivity and hearing loss of the user.

A predicted spectrum vector 920 of the active speaker is generated based on input from the correlated space, and the personalized frequency response is applied to the predicted spectrum vector 920 to adjust the volume level of frequencies that the user profile 930 indicates as requiring enhancement.

In addition to the visual-based predicted spectrum vector 920, an audio recording of the active speaker's speech is captured, e.g., via a microphone, such as the microphone array 308 of FIG. 3 or 510 of FIG. 5. In an embodiment, the audio is captured using beamforming technology to focus on a particular speaker, e.g. a speaker determined to be an active speaker based on a direction gaze, and discussed above regarding FIGS. 1-3B.

Figure 10:
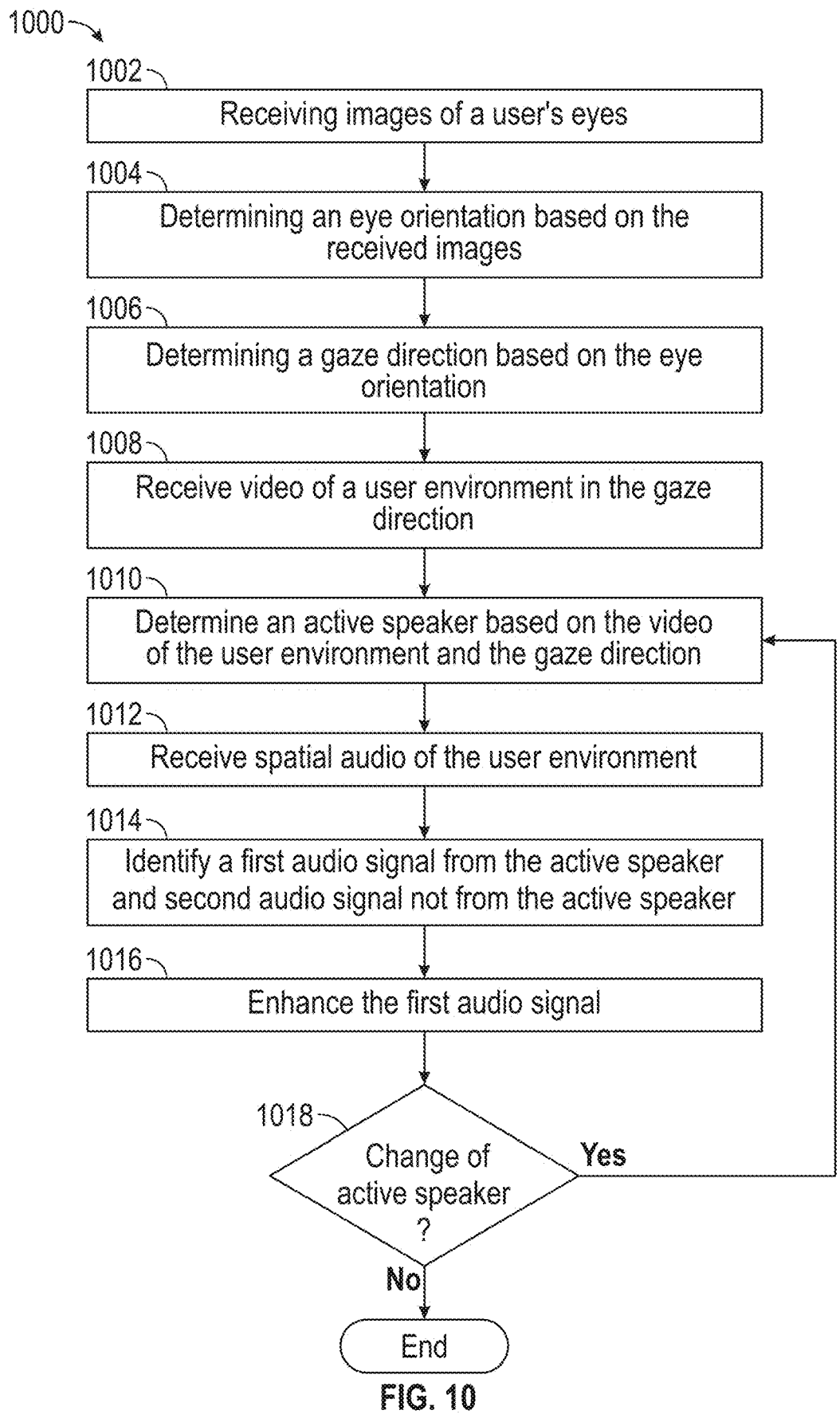
FIG. 10 is a flowchart representing an illustrative process for enhancing speaker audio based on gaze direction and environmental images, in accordance with some embodiments of the disclosure.

FIG. 10 is a flowchart 1000 representing an illustrative process for enhancing speaker audio based on gaze direction and environment images, in accordance with some embodiments of the disclosure.

At step 1002, images of a user's eyes are received. In an embodiment, the eye tracking sensor images are received via eye tracking sensors mounted onto an audio enhancing device, such XR glasses 108 of FIG. 1, 300 of FIG. 3, and 502 of FIG. 5. The eye tracking sensors may include one or more cameras illuminated by an infrared light source to allow for clear eye tracking sensor images of the user's eyes. In an embodiment, the eye tracking sensor images are received by a control circuitry of the XR glasses.

At step 1004, an eye orientation of one or both eyes of the user is determined based on the received eye tracking sensor images, and at step 1006, a gaze direction is determined based on the eye orientation as discussed further above in reference to FIG. 3A. An eye orientation is the position of the pupil of the eye, e.g., with respect to the user's face determine by analyzing the captured eye tracking sensor images, and the gaze direction is the direction in which the user's eye is pointing toward, which may be represented by a vector, a line, an angle with respect to a reference point, e.g., a polar angle, a line having a point of origin at the pupil of an eye of the user and an end point at the lips of a speaker, and the like. In an embodiment the eye orientation is determined with eye tracking sensors, and gaze direction is determining using the eye orientation and by analyzing captured images of a user environment and an orientation sensor of a user device, e.g., a pair of XR glasses.

At step 1008, video of a user environment is received. For example, a video stream is captured via cameras mounted on XR glasses, where the video stream captures a field of view in the direction in which the XR glasses are facing, and more precisely in the determined gaze direction of the user. In a further embodiment, sequential images of the field of view are received in addition to or in place of a video stream.

At step 1010, an active speaker is determined based on the captured video of a user environment and the determined gaze direction. In an embodiment, the active speaker is determining by analyzing the captured video of the user environment to identify all individuals within the captured video, e.g., by applying image recognition methods, and selecting an individual determined to most likely be an active speaker, e.g., based on lip movement, audio volume, gaze direction of nearby individuals, and the like.

At step 1012, spatial audio of the user environment is received. In an embodiment, the spatial audio includes audio signals from an environment captured using different microphones and processing the audio into a single, spatialized audio signal. The spatialized audio signal may be an audio signal containing additional metadata or information identifying a direction, movement, or acceleration of the audio received audio signals. In an embodiment, a fast beamforming algorithm is used to process audio signals received at each microphone, as discussed further above with reference to FIG. 5.

At step 1014, a first audio signal is identified from the spatial audio, wherein the first audio signal is determined as speech originating from the active speaker, e.g., based on an analysis of received audio signals, received environmental images, environmental audio processed by a beamforming algorithm, and the like. Audio determined not to be speech audio originating from the active speaker is identified as background audio, or as a second audio signal.

At step 1016, the first audio signal is enhanced. In an embodiment, enhancing the first audio signal includes increasing the volume level of the first audio. In a further embodiment, enhancing the first audio signal includes increasing the volume level of frequencies determined to be in need of enhancement based on user profile specific to the user of the audio enhancing device. For example, a user profile may include audiogram information of a user, indicating a first set of frequencies identified as requiring enhancement and a second set of frequencies not requiring enhancement. In a further embodiment, enhancing the first audio signal includes decreasing the second audio signal with respect to the first audio signal, e.g., decreasing background noise with respect to the volume level of the active speaker audio signal.

In yet a further embodiment, enhancing the first audio signal includes processing the first audio signal using automatic speech recognition (ASR) or speech-to-text (STT) to recognize words within the first audio signal and generate matching text. The generated matching text may be displayed on a screen, e.g., projected onto or displayed within a screen disposed on a lens of XR glasses. Text captions may be generated based on the audio signals and lip movements of the active speaker, as further discussed herein. In a further embodiment, enhancing the first audio signal includes enlarging an area in a digital display around the active speaker to.

At step 1018, it is determined if there is a change of the active speaker. This can be determined based on a change in the gaze direction and/or in audio characteristics of the first audio signal, e.g., tone, speed, intonation, accent, and the like of the received first audio signal. For example, if the tone and intonation of a received audio signal changes beyond a predetermined threshold for a specified minimum period of time, it may be determined that the active speaker status has changed, and a new individual is now identified as the active speaker. If the active speaker is determined to have changed, the method continues with step 1010 to determine a new active speaker based on the received video and gaze direction.

FIG. 11 is a block diagram showing components of a device 1100 for enhancing target voice audio, in accordance with some embodiments of the disclosure. The device 1100 may represent an example of any one or more of the devices 108, 300, or 502 in some embodiments, and it may perform the same or similar functionality described with respect to devices 108, 300, or 502 (e.g., the functionality described with respect to the methods discussed in connection with FIGS. 7-10). Device 1100 is depicted having components that are internal and external to device 1100, for example, processing circuitry 1106, storage 1108, and communications circuitry, such as Wi-Fi radio 1116 and mobile network telecommunication radio 1118, e.g., LTE, 5G, and the like. In some embodiments, each of the devices described herein (e.g., devices 108, 300, and 502) may comprise some or all of the components of device 1100.

I/O interface 1110 may provide content and data to control circuitry 1104 and control circuitry 1104 may be used to send and receive commands, requests, and other suitable data using I/O interface 1110. I/O interface 1110 may connect control circuitry 1104 (and specifically processing circuitry 1106) to one or more communications paths (e.g., Wi-Fi radio 1116, mobile radio 1118, communication path 1102). I/O functions may be provided by one or more of these communications paths, which may be shown as a single path in FIG. 11 to avoid overcomplicating the drawing.

Control circuitry 1104 may be based on any suitable processing circuitry such as processing circuitry 1106. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), GPUs, etc., and may include multiple parallel processing cores or redundant hardware. In some embodiments, processing circuitry 1106 may be distributed across multiple separate processors or processing units, for example, multiple of the same type of processors or multiple different processors. In some embodiments, control circuitry 1104 executes instructions stored in memory (e.g., storage 1108) and/or other non-transitory computer readable medium. Specifically, control circuitry 1104 may be instructed to perform the functions discussed above and below. For example, a device (e.g., any of devices 108, 300, and 502) may execute or comprise the code required to execute instructions associated with at least a portion of a voice enhancement device and may provide instructions to control circuitry 1104 to cause the output of enhanced audio (e.g., by causing the output of audio by any of devices 108, 300, and 502).

In some embodiments, control circuitry 1104 may include communications circuitry (e.g., Wi-Fi radio 1116 and/or mobile radio 1118 and/or a NFC radio) suitable for communicating with other networks (e.g., a LAN or a WAN), servers (e.g., a server accessed via the), or devices (e.g., any of devices 108, 300, and 502). The instructions for carrying out the above-mentioned functionality may be stored on storage 1108. The communications circuitry may include a modem, a fiber optic communications device, an Ethernet card, or a wireless communications device for communicating with other devices. Such communications may involve the Internet or any other suitable communications networks or paths. In addition, communications circuitry may include circuitry that enables peer-to-peer communication between devices (e.g., using UWB radio 1118).

Memory may be an electronic storage device provided as storage 1108 that is part of control circuitry 1104. As referred to herein, the phrase "electronic storage device" or "storage device" should be understood to mean any device for storing electronic data, computer software, or firmware, such as random-access memory, read-only memory, hard drives, optical drives, solid state devices, quantum storage devices, or any other suitable fixed or removable storage devices including non-transitory computer readable media for storing data or information, and/or any combination of the same. Storage 1108 may be used to store various types of data herein, such as instructions for performing the methods described herein. Nonvolatile memory may also be used (e.g., to launch a boot-up routine and other instructions). Cloud-based storage (e.g., storage accessed via the Internet) may be used to supplement storage 1108 or instead of storage 1108.

A user may send instructions to control circuitry 1104 using I/O interface 1110 using an external device such as a remote control, a mobile phone, a touch screen, etc. In some embodiments, control circuitry 1104 correlates a user input with a location of a user interface element and performs an action based on the selected user interface element.

Device 1100 may include one or more cameras 1111 for capturing still or video images, eye tracking sensors 1107, which may include separate eye tracking cameras and infrared light sources, a microphone 1109 or an array of microphones, a display 1112, and an audio output device such as speakers 1114. The display 1112 may be provided as integrated with other elements of device 1100. For example, display 1112 may be an augmented reality display of a pair of XR glasses, and may be combined with I/O interface 1110. Control circuitry 1104 may provide output via I/O interface 1110. In some embodiments, speakers 1114 may be connected to an output device, such as a pair of headphones, a single speaker, a speaker array, etc., to output sound to a user.

The systems and methods described herein may be implemented using any suitable architecture. For example, the systems and methods described herein may be a stand-alone application wholly implemented on device 1100. In such an approach, instructions of the application are stored locally (e.g., in storage 1108). In some embodiments, the systems and methods described herein may be a client-server-based application. Data for use by a thick or thin client implemented on device 1100 is retrieved on demand by issuing requests to a server remote from the device 1100. In some embodiments, the systems and methods provided herein are downloaded and interpreted or otherwise run by an interpreter or virtual machine (run by control circuitry 1104). In some embodiments, some functions are executed and stored on one device and some are executed and stored on a second device.

The processes described above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method of enhancing speech audio signals performed by an extended reality (XR) device being worn by a user, the method comprising:
   providing, by way of a display of the XR device, a view of a user environment, wherein the user environment is a real-world environment comprising at least a first person and a second person, and wherein the user is distinct from the first person and the second person;
   determining an eye orientation of the user based on eye tracking sensor images;
   determining a direction of gaze of the user based on the eye orientation of the user;
   causing capture of an image of the user environment in the direction of gaze;
   determining that the first person is an active speaker in the user environment based on the direction of gaze and on the captured image;
   causing a microphone array to capture spatial audio of the user environment;

determining, from the spatial audio, a first audio signal originating from the active speaker, and a second audio signal not originating from the active speaker;
enhancing an output of the first audio signal; and
modifying a portion of the view of the user environment corresponding to the active speaker, to highlight the first person corresponding to the active speaker in relation to the second person in the view of the user environment.

2. The method of claim 1, wherein determining the first audio signal from the spatial audio further comprises:
performing automatic speech recognition on the first audio signal using a first machine learning model, wherein the automatic speech recognition comprises generating text corresponding to the first audio signal.

3. The method of claim 2, wherein the first audio signal is determined using a second machine learning model based on a) visual information of lips of the active speaker from the captured image of the user environment and b) the generated text corresponding to the first audio signal.

4. The method of claim 2, further comprising:
displaying the generated text on the display of the XR device, wherein the generated text is displayed proximate to the modified portion.

5. A method of enhancing speech audio signals, comprising:
determining an eye orientation of a user based on eye tracking sensor images;
determining a direction of gaze of the user based on the eye orientation of the user;
causing capture of an image of a user environment in the direction of gaze;
determining an active speaker from the user environment based on the direction of gaze and on the captured image;
causing a microphone array to capture spatial audio of the user environment;
determining, from the spatial audio, a first audio signal originating from the active speaker, and a second audio signal not originating from the active speaker, wherein determining the first audio signal originating from the active speaker further comprises:
generating a spectrum vector of the spatial audio within the gaze direction;
inputting the captured image of the user environment and captured spatial audio into a trained machine learning model to generate a lip vector of the active speaker; and
determining the first audio signal based on the generated spectrum vector and the lip vector of the active speaker; and
enhancing the first audio signal.

6. The method of claim 5, wherein an attention model is applied to the trained machine learning model to focus on lips of the active speaker.

7. The method of claim 5, wherein the trained machine learning model is a convolutional neural network.

8. The method of claim 1, wherein enhancing the output of the first audio signal comprises:
increasing a volume level of the first audio signal relative to the second audio signal.

9. The method of claim 1, wherein modifying the portion of the view of the user environment corresponding to the active speaker comprises:
displaying, on the display of the XR device, an overlay of an enlarged portion of an image of lips of the active speaker on the captured image of the user environment.

10. The method of claim 1, wherein the microphone array employs beamforming to focus on the first audio signal, and wherein a direction of the beamforming is based on the determined direction of gaze of the user.

11. The method of claim 1, wherein:
providing, by way of the display of the XR device, the view of the user environment is based on capturing a video stream of the user environment; and
modifying the portion of the view of the user environment corresponding to the active speaker comprises:
modifying a portion of the video stream corresponding to the active speaker.

12. The method of claim 1, wherein:
the display is at least semi-transparent;
providing, by way of the display of the XR device, the view of the user environment is based on allowing the user to see through the display; and
modifying the portion of the view of the user environment corresponding to the active speaker comprises:
projecting an overlay onto the display, wherein the overlay comprises an enlarged view of the active speaker.

13. A system comprising:
an extended reality (XR) device, wherein the XR device is being worn by a user;
control circuitry configured to:
provide, by way of a display of the XR device, a view of a user environment, wherein the user environment is a real-world environment comprising at least a first person and a second person, and wherein the user is distinct from the first person and the second person;
determine an eye orientation of the user based on eye tracking sensor images;
determine a direction of gaze of the user based on the eye orientation of the user;
cause capture of an image of the user environment in the direction of gaze;
determine that the first person is an active speaker in the user environment based on the direction of gaze and on the captured image;
cause a microphone array to capture spatial audio of the user environment;
determine, from the spatial audio, a first audio signal originating from the active speaker, and a second audio signal not originating from the active speaker;
enhance an output of the first audio signal; and
modify a portion of the view of the user environment corresponding to the active speaker, to highlight the first person corresponding to the active speaker in relation to the second person in the view of the user environment.

14. The system of claim 13, wherein, when determining the first audio signal from the spatial audio, the control circuitry is further configured to:
perform automatic speech recognition on the first audio signal using a first machine learning model, wherein the automatic speech recognition comprises generating text corresponding to the first audio signal.

15. The system of claim 14, wherein the first audio signal is determined using a second machine learning model based on a) visual information of lips of the active speaker from the captured image of the user environment and b) the generated text corresponding to the first audio signal.

16. The system of claim 14, wherein the control circuitry is further configured to:

display the generated text on the display of the XR device, wherein the generated text is displayed proximate to the modified portion.

17. The system of claim 13, wherein the control circuitry, in determining the first audio signal originating from the active speaker, is further configured to:
  generate a spectrum vector of the spatial audio within the gaze direction;
  input the captured image of the user environment and captured spatial audio into a trained machine learning model to generate a lip vector of the active speaker; and
  determine the first audio signal based on the generated spectrum vector and the lip vector of the active speaker.

18. The system of claim 17, wherein an attention model is applied to the trained machine learning model to focus on lips of the active speaker, and the trained machine learning model is a convolutional neural network.

19. The system of claim 13, wherein, in enhancing the first audio signal, the control circuitry is configured to:
  increase a volume level of the first audio signal relative to the second audio signal.

20. The system of claim 13, wherein, in modifying the portion of the view of the user environment corresponding to the active speaker, the control circuitry is further configured to:
  display, on the display of the XR device, an overlay of an enlarged portion of an image of lips of the active speaker on the captured image of the user environment.

* * * * *